United States Patent Office 3,018,257
Patented Jan. 23, 1962

3,018,257
METHOD OF PREPARING EXPANDABLE RESINS COMPRISING DISSOLVING SAID RESIN IN A MISCIBLE BLEND OF ORGANIC LIQUIDS
Frank R. Spencer, Stamford, Conn., assignor to American Cyanamid Company, New York, N.Y., a corporation of Maine
No Drawing. Filed Oct. 26, 1959, Ser. No. 848,555
8 Claims. (Cl. 260—2.5)

This invention relates to the production of expanded cellular masses from solid synthetic polymers selected from the group consisting of vinyl aromatic thermoplastic polymers and polyesters of 2,2-bis(carboxyphenyl)alkanes containing a volatile organic foaming agent entrained therein. More particularly, the present invention relates to an improved method for the introduction of the liquid organic expanding agent into solid thermoplastic polymer. In essence, the invention involves the dissolution of the solid polymer in a miscible mixture comprising a combination of at least two non-solvents in proportions which produce a solvent for the polymer, and the subsequent reprecipitation of the dissolved polymer containing one of the non-solvents as the foaming agent therein.

In certain processes for the production of synthetic thermoplastic foam, it is necessary to subject polymer particles to the swelling action of a volatile non-solvent liquid organic expanding agent for a period of time in order for such an expanding agent to fully penetrate the polymer. One of the serious obstacles in impregnation or "soaking" the thermoplastic particles is the fact that the particles upon contact with the liquid expanding agent are not evenly permeated by the agent. Often the surface of these polymer particles becomes saturated and they soften at their periphery so they agglomerate or adhere together and are unusable. The present procedures for solvating polymer particles are in general extremely critical because solid materials which have a tendency to soften and agglomerate are involved. When softened, the material is difficult to handle and the resulting product is poor. In general, polymer particles which stick together or are unevenly permeated with expanding agent result in a foamed material which is non-homogeneous and unattractive; it cannot be processed efficiently and is unacceptable for many applications. The present invention is concerned with the discovery of a novel procedure for introducing liquid expanding agent into the thermoplastic polymer.

According to the present invention, I have discovered that the preparation of solvated solid particles of solid polymer may be very effectively accomplished by completely dissolving the solid polymer in a liquid mixture comprising at least two organic compounds, none of which individually are solvents for the polymer, but at least one of which is an expanding agent. When the polymer has been dissolved in the liquid mixture, the solid state of the polymer is then restored by upsetting the ratio of the mixture of non-solvents, thereby precipitating the polymer which then contains the expanding agent entrained therein. The polymer may be precipitated as discrete particles. By the procedure of the invention, the time required to introduce the organic expanding agent into the polymer is accelerated and the uniformity of expanding agent in the expandable polymer is vastly superior.

It is an object of the present invention to provide a novel procedure for introduction of liquid expanding agent into solid polymer for the production of expanded cellular structures of low, uniform density. Other objects and advantages will become apparent as the description of the invention proceeds.

In general, the procedure for preparing foamed shapes with which the present invention is concerned comprises heating discrete particles of polymer containing minor amounts of a volatile non-solvent organic liquid entrained therein until the material is expanded and formed into an integral cellular unit. Once the solid synthetic polymer has been treated so as to contain entrained expanding agent, any one of various known procedures may be employed to effect foaming of the polymer. For example, a blank of the desired shape may be prepared, and then expanded freely under heat. Optionally, this expanded blank shape may be molded or pressed so as to more precisely conform in detail to a desired configuration. Such a procedure is disclosed in U.S. Patent 2,442,940 (Staudinger). By an alternative procedure, the impregnated material may be fully expanded in a partially filled mold, for example, as described in U.S. Patent 2,744,291. In U.S. Patent 2,787,809, a two-stage expansion process is utilized for thermoplastic polymer in which particles less than 5 mm. diameter are partially expanded; then a mold is filled with partially pre-expanded polymer particles still containing some expanding agent and further expanded until a unitary shape is obtained. It will be apparent that the teaching of the present invention may be advantageously applied utilizing the above procedures among others. The shaping apparatus in which the expandable material is expanded includes not only molds, as this term is conventionally used, but also any apparatus having confining walls for the expanding polymer such as parallel wire belts or conveyors for continuous formation of slabs; or sandwich sheets employed in fabricating laminated structures. Also applicable is the procedure wherein the impregnated material is extruded from a hot, pressurized chamber and allowed to expand and cool as it leaves the extruder orifice.

The invention employs the properties of solubility of miscible organic liquid non-solvents for a given polymer. This property is expressed numerically as the solubility parameter of the liquid compound and its degree of hydrogen bonding. The principle and the basis for assigning numerical values to organic liquids is recognized and described in the literature. See, for example, (1) H. Burrel, Official Digest (of the Federation of Paint and Varnish Production Clubs), 27, No. 369, October 1955, pages 726–758; (2) P. A. Small, J. Appl. Chem., 3, pages 71–80, February 1953; and (3) W. R. Moore, Jr., Soc. Dyers and Colorists, 73, pages 500–506, November 1957, and literature references cited therein. It is to be understood that the principle employed in the cited references for ascertaining the measure of solubility to be ascribed to liquid organic compounds which may be suitable for use in the invention is applicable and is incorporated herein by reference. As described therein, the solubility parameter is related to the cohesive energy density of a given compound, i.e., to the amount energy which has to be put into one cc. of a compound to overcome the intermolecular forces which hold the molecules together. According to the principle of solubility parameters, the closer the solubility parameter and hydrogen bonding of a liquid is to that of a polymer, the more improved will be the solvency of that compound. The present invention relates to the use of liquid compounds having a low or moderate degree of hydrogen bonding. At least one of the compounds blended in the mixture employed in the invention has the characteristics of an expanding agent for the polymer and has a solubility parameter sufficiently different from the polymer so that it does not of itself dissolve the polymer. This difference, i.e., the deviation of the solubility parameter of a liquid compound from that of the polymer, will vary from polymer to polymer. In the case of vinyl aromatic polymers, for example, it is about 0.7.

According to the invention, certain organic liquid expanding agents having solubility parameters lower than that of the polymer and organic liquid having a solubility parameter higher than that of the polymer can be blended if miscible to provide a mixture having a mean solubility parameter close to that of the polymer. When such liquids have a low or medium degree of hydrogen bonding, the dissolution of solid polymer in such mixtures is rapid. The polymer may then be readily precipitated from this solution by the addition of highly hydrogen bonded liquid non-solvent such as the alcohols. In essence, the precipitating liquid, e.g., an alcohol such as methanol, ethanol, butanol and the like, preferentially removes one or more components of the solvent mixture, thereby changing the solubility parameter and as a consequence the polymer is precipitated with entrained expanding agent therein. The expanding agent is of itself a non-solvent for the polymer and is homogeneously distributed within the precipitated polymer. The theory, to which it is not intended that the invention be necessarily restricted, may be further described using a specific system as illustrative:

Acetone, having a solubility parameter above polystyrene, and n-pentane having a solubility parameter below polystyrene (and each of which is a non-solvent swelling agent for polystyrene) are blended into a miscible mixture in a ratio which dissolves the polystyrene. The polymer may then be precipitated by upsetting the ratio by bringing the polymer solution into contact with an alcohol, for example, methanol. The acetone, being the much more polar part of the miscible solvent mixture, will migrate into the alcohol phase much more readily than the n-pentane. Consequently, as the n-pentane is left behind, the ratio, which is necessary to form the solvent for the polymer, is upset and the polymer precipitates. As soon as the surface of the precipitated polymer solution is sealed by upsetting the balance of these liquids, the migration of any liquid below the surface of the "encapsulated" polymer is substantially cut off, retaining in the precipitated solid polymer a sufficient quantity of volatile non-solvent to serve as expanding agent.

Suitable polymers which may be utilized according to the invention include (I) the various synthetic thermoplastic materials prepared by the polymerization of vinyl aromatic compounds having the formula

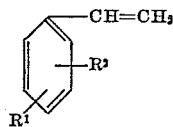

wherein $R^1$ and $R^2$ are substituents selected from the group consisting of hydrogen and alkyl radicals having 1–4 carbon atoms and their halogen substituted derivatives and (II) polyesters of 2,2-bis(carboxyphenyl)alkanes. Suitable illustrative compounds of the former type include polystyrene, polymethylstyrene, polydimethylstyrene, polychlorostyrene, and the like, and copolymers of vinyl aromatic monomers (of the type from which the foregoing polymers are prepared) with various compounds which have a polymerizable >C=C< group such as acrylonitrile, butadiene, ethyl acrylate, methyl methacrylate, diethyl maleate, ethyl methacrylate, and the like. When copolymers of this type are utilized, it is preferred that the chemically combined vinyl aromatic content of the copolymer be present in amounts of at least 85%. Correspondingly, preferably up to about 15% by weight of another copolymerizable monomer having a >C=C< group may be copolymerized with the above-described vinyl aromatic monomer. The polyesters contemplated are of the type obtained by the esterification of dicarboxylic acids of the formula

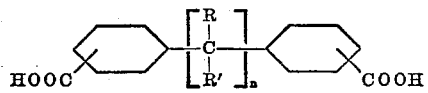

wherein R is an alkyl group containing 1 to 4 carbon atoms and R' is an alkyl group containing 2 to 4 carbon atoms and $n$ is a whole number between 1 and 2, inclusive. The preparation of these polyesters is described in U.S. Patents 2,794,822 and 2,848,486.

It is thus seen that according to the invention a given pair of non-solvents may be selected and blended into a mixture in such ratios that a solvent for the polymer or copolymer is obtained. It has been found that the expanding agent retained in the precipitated polymer is in the range of from about 2% to about 15% by weight based on the weight of the polymer and generally it is below 10%. Because of the uniform distribution of the expanding agent in the polymer, the problem of cohesion of the polymer particles is avoided and an even and thorough expansion of the solid polymer is possible. It will be apparent that a pair of liquid non-solvents which form an optimum solvent mixture for a given polymer (having a specific solubility parameter) would not necessarily be the optimum system for another polymer particularly in the same ratio of proportions and especially so if the solubility parameter of the second polymer is widely divergent from the first. However, no difficulty would be experienced by one skilled in the art, following the hereinabove provided teaching, in selecting suitable liquids to function effectively for a given polymer. The useful organic liquids are those which are non-solvents, which preferably have solubility parameters close to that of the polymer and which have medium or low hydrogen bonding. The alcohols and water which have a high degree of hydrogen bonding are consequently unsuitable in forming the liquid solvent mixture from two or more non-solvents.

To illustrate the variety of systems for a given polymer, the liquid organic compounds and their solubility parameters which may be utilized in the practice of this invention for incorporating expanding agent into the polymethylstyrene according to the principle described above, are set forth in Table I hereinbelow. The liquids listed are those which do not of themselves behave as solvents, i.e., do not dissolve the polymer in all proportions, but upon mixing in suitable proportion with other non-solvents, do effectively dissolve the polymer.

TABLE I

| Compound: | Solubility parameter |
|---|---|
| Isobutylene | 6.7 |
| n-Pentane | 7.0 |
| 1,3-butadiene | 7.1 |
| n-Hexane | 7.3 |
| n-Heptane | 7.4 |
| n-Octane | 7.6 |
| Isobutyl n-butyrate | 7.8 |
| Methylcyclohexane | 7.8 |
| Vinyl chloride (monomer) | 7.8 |
| Methyl nonyl ketone | 7.8 |
| Diisopropyl ketone | 8.0 |
| Methylamyl acetate | 8.0 |
| Cyclohexane | 8.2 |
| Methyl acetate | 9.6 |
| Acetone | 10.0 |
| o-Dichlorobenzene | 10.0 |
| Ethyl lactate | 10.0 |
| Methyl formate | 10.2 |
| Acrylonitrile | 10.5 |
| Butyronitrile | 10.5 |
| Pyridine | 10.7 |
| Nitroethane | 11.1 |
| Acetonitrile | 11.9 |
| N,N-dimethylformamide | 12.1 |
| Nitromethanol | 12.7 |
| Ethylene carbonate | 14.7 |
| N-methylformamide | 16.1 |

A more applicable listing, including the above group in part as well as additional compounds having appropriate solubility parameters may be prepared for other polymers. In other words, liquid organic compounds of the group having solubility parameters below about 8.2 and above about 9.7 are preferred in connection with vinyl aromatic polymers, whereas with polyesters of 2,2-bis-(carboxyphenyl)alkanes, liquid organic compounds having solubility parameters below about 9.6 in combination with those having solubility parameters above 10.5 are preferred.

Because of the low specific gravity of the foamed shapes prepared from the expandable plastic made according to this invention, the expanded material advantageously lends itself for a variety of purposes, e.g., as an insulating material for refrigerators or as structural components in buildings, for example. It may likewise be employed for sound insulation; mechanical shock insulation; electrical applications, e.g., microwave antennae; to provide buoyancy as in life belts or boat compartments; or as buoyancy and strength fillers in vacant sections of aircraft structure.

The invention will be more fully understood by reference to more specific embodiments of the invention as illustrated by the following examples. All proportions are by weight unless specifically noted otherwise.

Example 1

Polymethylstyrene of molecular weight of 80,000 to 100,000 was dissolved in the following proportions:

| | Parts by weight |
|---|---|
| Polymethylstyrene | 60 |
| Petroleum ether | 20 |
| Acrylonitrile | 20 |

This viscous solution was extruded directly into a stream of methanol, whereupon polymethylstyrene precipitated as a tough, coherent, stringy mass still containing sufficient petroleum ether, present as a non-solvent swelling agent. This stringy solid was strained from the methanol, dried and packaged.

The expandable polymethylstyrene prepared as above was loaded loosely into a mold which was then closed except for small perforations less than $\frac{1}{32}''$ wide. The loaded mold was placed in an autoclave and steam heated 4 minutes at 40 p.s.i. A lightweight, rigid object conforming to the shape of the mold and substantially closed cell was formed. It had a specific gravity of less than 0.1.

Example 2

The procedure of Example 1 was employed with the exception that the 40 parts of solvating mixture comprised 80 parts of n-pentane and 20 parts of N,N-dimethyl formamide and was used to dissolve the polymethylstyrene, 60 parts. The solution is separated from the solvent mixture by precipitating with methanol and dried. The product upon expansion in the mold has a specific gravity of less than 0.1.

Example 3

Fifteen parts by weight of polymethylstyrene were dissolved in 85 parts of a blend of equal volumes of n-hexane and acetone. This liquid solution was poured at a rate inducing the formation of discrete particles into a large excess of 2B alcohol. The discrete particles, which formed a hardening surface as soon as they entered the alcohol, were distributed so that they deposited separately. After a period of 5 minutes the hardened drops were strained off and superficially dried. A portion was expanded and molded immediately by conventional means. The density of the formed polymer was less than 2 pounds per cubic foot. Another portion was aged for one month after which it was expanded and molded. This expanded product had a like density.

Example 4

Four hundred grams of polystyrene were dissolved in 600 grams of a blend of equal volumes of nitroethane and petroleum ether by malaxating in a closed, heavy duty mixer. The resulting paste was extruded beneath the surface of methanol and the extruded rod was cut into pellets. The pellets were aged 5 to 10 minutes in the methanol, then strained off and dried on the surface. These pellets were aged one month, pre-expanded and molded. The density was less than 2 pounds per cubic foot.

Example 5

Fifty parts of a polyester prepared from ethylene glycol and 4,4' butylidene-bis-benzoic acid was dissolved in 500 parts of a 1 to 1 blend of acrylonitrile and methyl acetate. The solution was poured into 2B alcohol, cut into pellets while submerged, strained off and superficially dried. After aging 1 month the pellets were expanded into foamed up particles having a bulk density of less than 5 pounds per cubic foot by heating 5 minutes at 200° F.

While the foregoing discloses only a limited number of embodiments of the compositions and process which may be advantageously practiced by the inventive concept provided herein, it is possible to vary such compositions without departing from the invention. Accordingly, the invention should not be limited as to details except insofar as specified in the appended claims.

I claim:
1. A method of preparing expandable resins from solid synthetic thermoplastic polymers selected from the group consisting of monocyclic vinyl aromatic polymers and polyesters of 2,2-bis(carboxyphenyl)alkanes which comprises dissolving said polymer in a miscible blend of organic liquids, at least one of which has a solubility parameter below and at least one of which has a solubility parameter above that of the polymer, said blend comprising at least two organic liquids, each of which liquids individually is a non-solvent for said polymer, the liquid of lower solubility parameter for the polymer being an expanding agent, and precipitating said polymer from said solvent blend by the addition of a non-solvent for said polymer selected from the group consisting of aliphatic alcohols containing from 1 to 4 carbon atoms and water.

2. A method of preparing expandable polystyrene which comprises dissolving said polystyrene in a miscible blend of organic liquids having a solubility parameter below about 8.2 and above about 9.7, said blend comprising at least two organic liquids, each of which liquids individually is a non-solvent for said polymer, at least one of which has a solubility parameter below and at least one of which has a solubility parameter above that of polystyrene, and precipitating said polymer from said combination solvent by the addition of an organic liquid non-solvent for said polymer.

3. A method of preparing expandable polymethylstyrene which comprises dissolving said polymethylstyrene in a miscible blend of organic liquids having a solubility parameter below about 8.2 and above about 9.7, said combination comprising at least two organic liquids, each of which liquids individually is a non-solvent for said polymer, at least one of which has a solubility parameter below and at least one of which has a solubility parameter above that of polymethylstyrene, and precipitating said polymer from said combination solvent by the addition of an organic liquid non-solvent for said polymer.

4. A method of preparing an expandable polyester of 2,2-bis(carboxyphenyl)alkanes which comprises dissolving said polyester in a miscible blend of organic liquids having a solubility parameter below about 9.6 and above about 10.5, said combination comprising at least two organic liquids, each of which liquids individually is a non-solvent for said polyester, at least one of which has a solubility parameter below and at least one of which has a solubility parameter above that of the polyester, and precipitating said polyester from said combination solvent by the addition of an organic liquid non-solvent for said polyester.

5. A method of preparing an expandable polyester of 2,2-bis(carboxyphenyl)butane which comprises dissolving said polyester in a miscible blend of organic liquids having a solubility parameter below about 9.6 and above about 10.5, said combination comprising at least two organic liquids, each of which liquids individually is a non-solvent for said polyester, at least one of which has a solubility parameter below and at least one of which has a solubility parameter above that of said polyester, and precipitating said polyester from said combination solvent by the addition of an organic liquid non-solvent for said polymer.

6. The method of claim 5 wherein the non-solvent liquids are acrylonitrile and methyl acetate.

7. A method of preparing expandable polystyrene which comprises dissolving said polystyrene in a blend of petroleum ether and acrylonitrile and precipitating said polymer from said combination solvent by the addition of methanol.

8. A method of preparing expandable polymethylstyrene which comprises dissolving said polymethylstyrene in a blend of petroleum ether and acrylonitrile and precipitating said polymer from said combination solvent by the addition of methanol.

References Cited in the file of this patent
UNITED STATES PATENTS

| | | |
|---|---|---|
| 2,744,291 | Stastny et al. | May 8, 1956 |
| 2,779,062 | Stastny | Jan. 29, 1957 |
| 2,797,443 | Carlson | July 2, 1957 |